Sept. 22, 1953 P. P. NEWCOMB 2,652,730
DRIVE FOR PROPELLERS
Filed April 6, 1946 2 Sheets-Sheet 1

INVENTOR
PHILIP P. NEWCOMB

ATTORNEY

Sept. 22, 1953        P. P. NEWCOMB        2,652,730
               DRIVE FOR PROPELLERS
Filed April 6, 1946                    2 Sheets-Sheet 2

INVENTOR
PHILIP P. NEWCOMB

Charles A. Warren

ATTORNEY

UNITED STATES PATENT OFFICE 2,652,730

DRIVE FOR PROPELLERS

Philip P. Newcomb, Manchester, Conn., assignor to United Aircraft Corporation, East Hartford, Conn., a corporation of Delaware Application April 6, 1946, Serial No. 660,239

8 Claims. (Cl. 74—732)

This invention relates to a drive connection, and particularly to a connection between a compressor-turbine power plant, and the propeller driven by it.

The turbine shaft in this type of power plant rotates at a relatively high speed and the inertia of the driven elements, such as the reduction gears and the propeller mechanism, is such that in starting the propeller mechanism a direct clutching of the turbine shaft to the driven elements is not feasible. A feature of this invention is an arrangement for bringing the driven shaft up to speed before it is positively connected to the driving shaft.

Another feature of the invention is the use, in conjunction with a fluid coupling, of an overspeed drive to correct for the slip in the coupling so that the driven shaft will be rotating at least as fast as the driving shaft when the positive clutch is engaged.

A feature of the invention is an interlocking device which will prevent engagement of the positive clutch between a driving and driven shaft until the driven shaft is rotating slightly faster than the driving shaft.

Other objects and advantages will be apparent from the specification and claims and from the accompanying drawing which illustrates what is now considered to be a preferred embodiment of the invention.

Fig. 2 is a sectional view through the drive connection.

Fig. 3 is a fragmentary sectional view on line 3—3 of Fig. 2.

Figure 1:
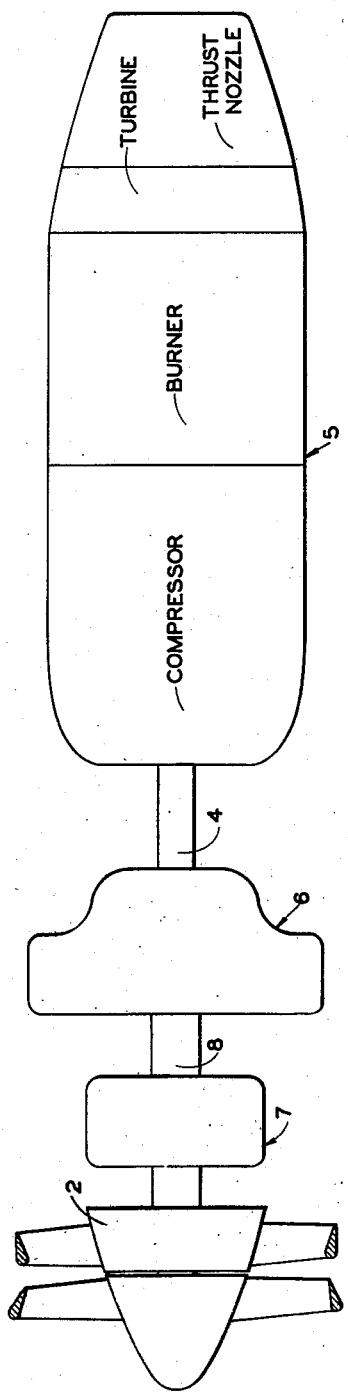
Fig. 1 is a diagrammatic showing of an installation of the drive connection.

As shown in Fig. 1, the propeller system 2 is driven from the shaft 4 of a turbine-compressor power plant 5 through the drive connection 6 and a reduction gear unit 7 which may be connected to the driven shaft 8 of the drive connection. The drive connection serves to disconnect the power plant from the propeller during starting of the power plant.

The driving shaft 4 of the drive connection, Fig. 2, has mounted thereon a cap 9, which has one set of teeth 10 of a toothed clutch, the other set of teeth 11 of which is carried by a sleeve 12 splined at 13 to the driven shaft 8. The cap 9 is splined to shaft 4 and during normal operation the teeth 10 and 11 interengage and the drive for shaft 8 is through these teeth.

For bringing the driven shaft 8 up to speed, cap 9 has a gear 16 meshing with a pinion 18 on a fixed support 20. Integral with pinion 18 is another somewhat larger pinion 22 which meshes with a gear 24 on the driving part 26 of a fluid coupling 28. The part 26 is supported by a housing 30 which is supported by, and free to rotate on, the driven shaft 8.

The other or driven part 32 of the fluid coupling is positioned within the housing 30 and is splined as at 34 to the driven shaft. By introducing fluid to the space between the two parts of the fluid coupling, it is possible to transmit torque to set the driven shaft in motion.

It is well known that there is a predetermined amount of slip between the driving and driven parts of a fluid coupling. To compensate for this slip, the dimensions of the pinions 18 and 22 are selected so that the driving part 26 of the fluid coupling is rotated at a speed somewhat higher than that of the driving shaft so that the resulting speed of driven shaft 8, when the drive is through the hydraulic coupling, will be slightly higher than the speed of the driving shaft thereby over-compensating for the slip.

Fluid is admitted to the coupling through a passage 36 in a plug 38 located within the driven shaft 8 and held in place as by a pin 40. From a chamber 42 in plug 38 fluid escapes through ports 44 which are aligned with passages 46 in the sleeve 12. From the passages 46 fluid passes between the teeth of the splines 13 and through radial passages 48 in the driven shaft.

The sleeve 12 may be moved into position to engage the teeth 10 and 11 by a coil spring 50 located between the sleeve and a ring shaped piston 52 positioned within the driven shaft and slidable on a cylindrical extension 53 of the sleeve 12. The extension 53 is guided by the outside wall 54 of the chamber 42. With piston 52 in the position shown, the normal unloaded length of spring 50 is such that the clutch teeth are out of engagement as shown. When piston 52 is moved to the left, however, the spring 50 is loaded and urges the clutch teeth into engagement.

A valve 55 is slidable in a radial bore 56 in the plug 38 and is normally held in the position shown by a spring 60. When, upon rotation of the driven shaft, the centrifugal force on valve 55 overcomes the force of spring 60, this valve will move radially outward to establish fluid connection between the passages 62 and 64 which communicate respectively with the chamber 42 and the space at the right of piston 52. When this occurs, fluid under pressure from the chamber enters the space at the right of piston 52 and urges it to the left to move the clutch teeth 10 and 11 into engagement.

Interengagement of teeth 10 and 11 may be prevented until the driven shaft is moving slightly faster than the driving shaft. To accomplish this, the sleeve 12 is internally splined at its left end and supports a clutch element 66. This element is normally held in engagement with a clutch surface 68 on the cap 9 by a spring 70 located between the clutch element 66 and a plug 72 positioned within the end of sleeve 12. The plug 72 carries projecting pins 74 normally out of alignment with holes 76 in the clutch element 66.

As shown in Fig. 3, the splines for the clutch element 66 allow it to rotate through a small angle with respect to sleeve 12. Thus, when the drive connection is started for the purpose of bringing the driven shaft up to speed, the clutch element 66 is moved by the driving shaft into a position such that the pins 74 do not align with the holes 76. However, when the driven shaft reaches the speed of the driving shaft and begins to exceed it, the rate of rotation of the plug 72 will be slightly greater than the rate of rotation of the element 66 so that the pins will be aligned with and enter the holes 76 thereby permitting the sleeve 12 to move to the left far enough for the teeth 10 and 11 to engage. When this occurs, the passages 46 will be moved out of alignment with the ports 44 and the supply of fluid to the fluid coupling will be discontinued. The fluid in the coupling drains through openings 78 in the housing 30 so that the fluid coupling will become inoperative and the driven shaft will be positively driven through the clutch teeth. The over-compensation for the slip of the fluid coupling makes possible the slight overspeed of the driven shaft necessary to allow the clutch teeth to engage.

In operation, with the compressor-turbine unit running, the propeller may be started by admitting fluid under pressure to the passage 36. This fluid under pressure reaches the fluid coupling through passages 46 and aligned ports 44, the parts being in the position shown, and causes torque to be applied to the driven shaft.

As the driven shaft approaches the speed of the driving shaft, the valve 55 moves out by centrifugal force and causes fluid to enter the space at the right of piston 52 to move the clutch elements toward each other. The pins 74 however, being out of line with the holes 76, prevent engagement between the clutch elements until the driven shaft moves slightly faster than the driving shaft. With a slight overspeed, the element 66 is moved more slowly than plug 72 to align the holes with pins 74 and allow the clutch teeth to be engaged. The overspeed of the driven shaft is provided by the gear train which, by having pinion 22 larger than pinion 18, will compensate for slip in the coupling and assure a rotation of the driven shaft at least as fast as the driving shaft.

When the power plant is stopped, valve 55 is returned by spring 60 to the position shown, and the space at the right of piston 52 is then vented through a groove 79 and passage 80 in the valve to a venting passage 82 in shaft 8. Spring 70 is heavy enough to shift sleeve 12 to the right to disengage the clutch teeth.

It is to be understood that the invention is not limited to the specific embodiment herein illustrated and described, but may be used in other ways without departure from its spirit as defined by the following claims:

I claim:

1. A drive connection between a turbine and a propeller including a drive shaft connected to the turbine and a driven shaft connected to the propeller, a fluid coupling drivingly connected to one of said shafts and a gear train providing a driving connection between the coupling and the other of said shafts, said gear train including a speed increasing arrangement by which to cause the driven shaft to rotate at a speed higher than that of the driving shaft thereby overcompensating for slip in the coupling, and a positive toothed clutch providing a connection between said shafts and adapted to be engaged when the driven shaft overspeeds the driving shaft.

2. A drive connection between a turbine and a propeller including a drive shaft connected to the turbine and a driven shaft connected to the propeller, a fluid coupling drivingly connected to one of said shafts, and a gear train providing a driving connection between the coupling and the other of said shafts, said gear train including a speed increasing arrangement by which to cause the driven shaft to rotate at a speed higher than that of the driving shaft thereby overcompensating for slip in the coupling, a positive toothed clutch providing a connection between said shafts, and means for automatically engaging said clutch when the driven shaft overspeeds the driving shaft.

3. A drive connection between a turbine and a propeller including a drive shaft connected to the turbine and a driven shaft connected to the propeller, a fluid coupling drivingly connected to one of said shafts and a gear train providing a driving connection between the coupling and the other of said shafts to cause the driven shaft to rotate at a speed higher than that of the driving shaft thereby overcompensating for slip in the coupling, a positive toothed clutch connecting said shafts, means including a speed responsive valve associated with the driven shaft, and hydraulic means controlled by said valve for moving said toothed clutch into driving position.

4. A drive connection between a driving and a driven shaft including a positive clutch connecting said shafts, means for retaining the clutch in inoperative position while the driving shaft is rotating faster than the driven shaft, a fluid coupling including driving and driven parts connected respectively to said driving and driven shafts, and a speed changing gear train between one of said parts and the associated shaft including a speed increasing arrangement to cause the driven shaft to rotate at least as fast as the driving shaft to compensate for slipping in said coupling.

5. A drive connection between a driving and a driven shaft including a positive clutch connecting said shafts, means for operating the clutch, a fluid coupling also connecting said shafts in parallel relation to the positive clutch, and speed responsive means associated with the driven shaft for procuring actuation of said clutch operating means when the driven shaft reaches a predetermined speed and cooperating means associated with said shafts to prevent engagement of the positive clutch until the speed of driven shaft has exceeded the speed of the driving shaft.

6. A drive connection between a driving and a driven shaft including a positive clutch connecting said shafts, means for operating the clutch, a fluid coupling also connecting said shafts in parallel relation to the positive clutch, speed responsive means associated with the driven shaft for procuring actuation of said clutch operating means when the driven shaft reaches a predetermined speed, and lockout means associated with said shafts to prevent engagement of the positive clutch until the driven shaft is rotating faster than the driving shaft.

7. A drive connection between a driving and a driven shaft including a positive clutch connecting said shafts, means for operating the clutch, a fluid coupling also connecting said shafts in parallel relation to the positive clutch, speed responsive means associated with the driven shaft for procuring actuation of said clutch operating means when the driven shaft reaches a predetermined speed, and means for cutting off the supply of fluid to the coupling when the positive clutch is engaged.

8. A drive connection between a driving and a driven shaft including a positive clutch connecting said shafts, means for operating the clutch, a fluid coupling also connecting said shafts in parallel relation to the positive clutch, speed responsive means associated with the driven shaft for procuring actuation of said clutch operating means when the driven shaft reaches a predetermined speed, and means for rendering inoperative the fluid coupling in response to movement of the clutch operating means into clutch engaged position.

PHILIP P. NEWCOMB.

References Cited in the file of this patent

UNITED STATES PATENTS

| Number | Name | Date |
| --- | --- | --- |
| 2,170,649 | Banker | Aug. 22, 1939 |
| 2,212,278 | Sinclair | Aug. 20, 1940 |
| 2,267,334 | Keller | Dec. 23, 1941 |
| 2,332,593 | Nutt et al. | Oct. 26, 1943 |
| 2,351,483 | Carnagua | June 13, 1944 |
| 2,404,657 | Roberts et al. | July 23, 1946 |